United States Patent
Garel et al.

(10) Patent No.: US 9,600,944 B1
(45) Date of Patent: Mar. 21, 2017

(54) AIRCRAFT AERODYNAMIC AUDIT SYSTEM FOR ENHANCED FUEL EFFICIENCY

(71) Applicants: AIRBUS (S.A.S.), Blagnac (FR); AIRBUS OPERATIONS LIMITED, Bristol (GB)

(72) Inventors: Dominique Garel, Grenade (FR); Jean-Max Huet, Launaguet (FR); Tim Chant, Bristol (GB); Simon Weselby, Cornebarrieu (FR); Anne-Lise Ricard, Pibrac (FR)

(73) Assignees: Airbus SAS, Blagnac (FR); Airbus Operations Limited, Bristol (GB)

( * ) Notice: Subject to any disclaimer, the term of this patent is extended or adjusted under 35 U.S.C. 154(b) by 0 days.

(21) Appl. No.: 14/880,754

(22) Filed: Oct. 12, 2015

(51) Int. Cl.
*G06F 17/30* (2006.01)
*G07C 5/08* (2006.01)
*G07C 5/00* (2006.01)
*B64F 5/00* (2006.01)
*G06Q 10/00* (2012.01)

(52) U.S. Cl.
CPC ............... *G07C 5/08* (2013.01); *B64F 5/0045* (2013.01); *G06Q 10/20* (2013.01); *G07C 5/008* (2013.01)

(58) Field of Classification Search
USPC ............... 701/3, 31.4; 348/92; 707/758, 781
See application file for complete search history.

(56) References Cited

U.S. PATENT DOCUMENTS

| | | | | |
|---|---|---|---|---|
| 7,389,181 | B2* | 6/2008 | Meadow | G06F 17/30241 342/357.31 |
| 7,756,883 | B2* | 7/2010 | Chien | G06F 17/3028 707/758 |

(Continued)

OTHER PUBLICATIONS

Surface crack detection for carbon fiber reinforced plastic (CFRP) materials using pulsed eddy current testing; Jialong Wu; Deqiang Zhou; Jun Wang; Xuedong Guo; Lihua You; Wei An; Hong Zhang; Nondestructive Evaluation/Testing (FENDT), 2014 IEEE Far East Forum on; Year: 2014; pp. 181-185, DOI: 10.1109/FENDT.2014.6928258.*

(Continued)

*Primary Examiner* — Cuong H Nguyen
(74) *Attorney, Agent, or Firm* — Greer, Burns & Crain Ltd.

(57) ABSTRACT

An aerodynamic audit system is provided for performing an audit process of an aircraft using a computing device via a network. An inspection module inspects at least a portion of the aircraft for locating and measuring any aerodynamic defects present by generating an inspection list having a predetermined inspection path. A display device displays the inspection path and accepts a measurement of any located aerodynamic defect. A fuel penalty estimation module calculates an estimated fuel penalty of the aerodynamic defect based on the measurement of the corresponding aerodynamic defect. A defect correction analysis module analyzes the aerodynamic defect based on a cost and benefit assessment. A findings collection module generates an audit report based on the inspection and analysis of the aerodynamic (Continued)

defect. A database stores data associated with the aerodynamic defect and the corresponding fuel penalty based on the cost and benefit assessment.

18 Claims, 19 Drawing Sheets

(56) References Cited

U.S. PATENT DOCUMENTS

| | | | | |
|---|---|---|---|---|
| 2002/0091991 A1* | 7/2002 | Castro | G06F 9/06 | 717/106 |
| 2004/0183900 A1* | 9/2004 | Karpen | G01N 21/8803 | 348/92 |
| 2010/0125383 A1* | 5/2010 | Caouette | B63H 21/17 | 701/21 |
| 2011/0261186 A1* | 10/2011 | Blackburn | H04N 1/2187 | 348/92 |
| 2014/0000266 A1* | 1/2014 | Dillard | B23K 1/0018 | 60/752 |
| 2015/0192526 A1* | 7/2015 | Nissen | G01N 21/91 | 348/92 |
| 2015/0193919 A1* | 7/2015 | Nissen | G06T 7/001 | 348/92 |

OTHER PUBLICATIONS

Frequency warping compressive sensing for structural monitoring of aircraft wing; Alessandro Perelli; Sevan Harput; Luca De Marchi; Steven Freea; Digital Signal Processing (DSP), 2013 18th International Conference on; Year: 2013 pp. 1-6, DOI: 10.1109/ICDSP. 2013.6622668.*

Use of Three Dimensional Imaging to Perform Aircraft Composite Inspection: Proof of Concept; Lee T. Ostrom; Cheryl A. Wilhelmsen; Roger L. Scott; 2012 5th International Conference on Human System Interactions; Year: 2012 pp. 53-58, DOI: 10.1109/ HSI.2012.18.*

Optimization of PECT system for defect detection on aircraft riveted structures; Hu Xiangchao; Luo Feilu; Computer Science and Network Technology (ICCSNT), 2011 International Conference on; Year: 2011, vol. 2; pp. 996-999, DOI: 10.1109/ICCSNT.2011. 6182129.*

A Resonant Microwave Patch Sensor for Detection of Layer Thickness or Permittivity Variations in Multilayered Dielectric Structures; Yang Li; Nicola Bowler; David Bennett Johnson; IEEE Sensors Journal; Year: 2011, vol. 11, Issue: 1 pp. 5-15, DOI: 10.1109/JSEN. 2010.2051223.*

Defect trend analysis of T56 engine after overhaul; Khurram Shahzad; Irfan Anjum Manarvi; Aerospace Conference, 2012 IEEE Year: 2012; pp. 1-6, DOI: 10.1109/AERO.2012.6187381.*

Structural health monitoring: Subsurface defects detection; Wai Yie Leong; Liu Wei; Industrial Electronics, 2009. IECON '09. 35th Annual Conference of IEEE; Year: 2009; pp. 4326-4330, DOI: 10.1109/IECON.2009.5414919.*

Envelope bearing analysis: theory and practice; D. Hochmann; E. Bechhoefer; 2005 IEEE Aerospace Conference; Year: 2005 pp. 3658-3666, DOI: 10.1109/AERO.2005.1559671.*

"FAST #56," Flight Airworthiness Support Technology, Airbus Technical Magazine, Aug. 2015, pp. 26-31.

* cited by examiner

| Zone | Inspection | Recorded Findings | | Fuel Penalty (KGs per FH) | Correction (AMM Task) |
|---|---|---|---|---|---|
| | | Finding | Add. Info. | | |
| Left Wing | Slat 1 average misrig | None | None | 0 | N/A |
| | ... | ? | ? | ? | ? |
| | Spoiler 1 average misrig | 0.2cm | T P | 0 | N/A |
| | ... | ? | ? | ? | ? |
| | Flap seal inboard | 8cm | T | 5 | 27-54-61 PB401 |
| | Flap seal outboard | 0cm | None | 0 | N/A |
| | Flap Seal Outboard wing to surface | 0cm | None | 0 | N/A |
| | ... | ? | ? | ? | ? |
| | Spoiler 1 seal cordwise | 15cm | T | 6 | 27-64-61 PB401 |
| | ... | ? | ? | ? | ? |
| | Flap Track Fairing 4 Fixed to Moving average step | 0.5cm | P | 1 | 57-55-41 PB401 |
| | ... | ? | ? | ? | ? |
| | Upper wing paint (fwd inbd) | X: 80cm Y:60m P:50% | | 4 | 51-23-00 PB201 |
| Right Wing | ... | ? | | ? | ? |
| Fwd Fus. | ... | ? | | ? | ? |
| Aft Fus. | ... | ? | | ? | ? |

AIRCRAFT AERODYNAMIC AUDIT SYSTEM FOR ENHANCED FUEL EFFICIENCY

FIELD OF THE DISCLOSURE

The present disclosure generally relates to aircraft audit systems, and in particular relates to an aerodynamic audit system for providing enhanced fuel efficiency or reduced fuel consumption of an aircraft.

BACKGROUND OF THE INVENTION

For most airlines, fuel costs have emerged as one of the largest expenses for operating the aircraft. To improve the fuel efficiency of the aircraft, an aviation industry has been searching for suitable technologies, shapes, and materials that would enhance flight much more efficient and profitable. One of the ways to boost the fuel efficiency is to improve aerodynamics of the aircraft. Flight operating costs can be substantially increased when aerodynamic drag of the aircraft is increased, which can also result in increased fuel consumption. However, in certain cases, improving the aircraft aerodynamics is relatively a more cost effective task than improving engine fuel efficiency.

Although drag may not be a primary cause of poor fuel efficiency, a minor reduction in a drag coefficient can improve the aircraft fuel efficiency during operation. Such a drag reduction may restore the aircraft's original configuration and result in enhanced performance. For example, at a low speed, drag may not be an important factor, but the faster the aircraft travels, the more drag matters in relation to the fuel efficiency. Thus, aircraft aerodynamicists and maintenance crew constantly inspect the aircraft, and identify any potential or apparent aerodynamic issues to reduce drag for the aircraft.

It is important to collect and access information associated with the fuel efficiency from different aeronautic institutions or business concerns, such as an airline management center and an aircraft manufacturer. However, conventional aircraft audit systems fail to provide communication links between maintenance entities, and also fail to provide synchronized data relating to the fuel efficiency. Further, audit procedures utilized by the conventional audit systems have audit steps that are difficult to track and perform because audited aircraft models may be incompatible with the audit procedures, and changes to the audit procedures are not acknowledged before initiating an inspection sequence.

Therefore, there is a need for developing an improved aircraft audit system that is easy for an auditor to perform the audit steps for enhancing the fuel efficiency of the aircraft.

SUMMARY OF THE INVENTION

Advantages are achieved by the present aircraft aerodynamic audit system (or tool) which automatically performs a fuel penalty calculation based on detected aerodynamic defects of the audited aircraft. A value of the fuel penalty is determined based on and associated with each of the detected aerodynamic defects. An important aspect of the present aircraft aerodynamic audit system is that the present system provides communication links between the maintenance entities, which refer to any institutions associated with the aerodynamic defects, such as the airline management center and the aircraft manufacturer. For example, when calculating the fuel penalties of detected aerodynamic defects, experience feedback is received from the maintenance entities, and considered in revising and refining the values of the fuel penalties.

Another advantage of the present aircraft aerodynamic audit system is that the present system provides graphical representation of an audit procedure to the auditor during audit operation. For example, when the auditor logs into the present audit system, specific inspection areas of the aircraft are graphically displayed on a screen for easy identification and overview of the inspection areas. Also, associated audit parameters and measurement attributes are interactively and graphically displayed based on an aircraft configuration or model.

In one embodiment, an aerodynamic audit system is provided for performing an audit process of an aircraft using a computing device via a network. An inspection module detects at least a portion of the aircraft for locating the presence of any aerodynamic defects, and generates an inspection list having a predetermined inspection path. In one embodiment, the portion of the aircraft for inspection is highlighted for easy recognition. A display device displays the inspection path and accepts a measurement of any located aerodynamic defect. A fuel penalty estimation module calculates an estimated fuel penalty of the aerodynamic defect based on the measurement of the corresponding aerodynamic defect. A defect correction analysis module analyzes the aerodynamic defect based on a cost and benefit assessment. A findings collection module generates an audit report based on the inspection and analysis of the aerodynamic defect. A database stores data associated with the aerodynamic defect and the corresponding fuel penalty based on the cost and benefit assessment.

In another embodiment, an aerodynamic audit method is provided for performing an audit process of an aircraft using a computing device via a network. Included in the method are, using the computing device, detecting or locating aerodynamic defects on the aircraft or part of it, and generating an inspection list having a predetermined inspection path; calculating an estimated fuel penalty, using the computing device, of the aerodynamic defect based on a measurement of the corresponding aerodynamic defect; analyzing the aerodynamic defect, using the computing device, based on a cost and benefit assessment; generating an audit report, using the computing device, based on the inspection and analysis of the aerodynamic defect; displaying the inspection path and accepting the measurement of the corresponding aerodynamic defect on a display device of the computing device; and storing data associated with the aerodynamic defect and the corresponding fuel penalty in a database of the computing device.

In yet another embodiment, an aircraft having an aerodynamic audit system is provided for performing an audit process for the aircraft using a computing device via a network. The aircraft aerodynamic audit system comprising instructions to: using the computing device, detect an aerodynamic defect of the aircraft, and generate an inspection list having a predetermined inspection path; calculate an estimated fuel penalty, using the computing device, of the aerodynamic defect based on a measurement of the corresponding aerodynamic defect; analyze the aerodynamic defect, using the computing device, based on a cost and benefit assessment; generate an audit report, using the computing device, based on the inspection and analysis of the aerodynamic defect; display the inspection path and accepts the measurement of the corresponding aerodynamic defect on a display device of the computing device; and store data associated with the aerodynamic defect and the corresponding fuel penalty in a database of the computing device.

The foregoing and other aspects and features of the disclosure will become apparent to those of reasonable skill in the art from the following detailed description, as considered in conjunction with the accompanying drawings.

BRIEF DESCRIPTION OF THE DRAWINGS

FIG. 4 illustrates an exemplary audit report generated by the present aircraft aerodynamic audit system of FIG. 1;

FIGS. 5-19 illustrate exemplary graphical representations of the present aircraft aerodynamic audit system of FIG. 1, using a portable computing device with an interactive display.

DETAILED DESCRIPTION OF THE PREFERRED EMBODIMENTS

Preferred embodiments of the present disclosure are described below by way of example only, with reference to the accompanying drawings. Further, the following description is merely exemplary in nature and is in no way intended to limit the disclosure, its application, or uses.

As used herein, the term "module," or "unit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Although children modules residing in their respective parent modules are shown, the broad teachings of the present system can be implemented in a variety of forms. Thus, while this disclosure includes particular examples and arrangements of the modules, the scope of the present system should not be so limited since other modifications will become apparent to the skilled practitioner.

Exemplary embodiments herein below are directed primarily to aircraft aerodynamic audit systems. However, the present system can be implemented for other types of products or services.

Figure 1:
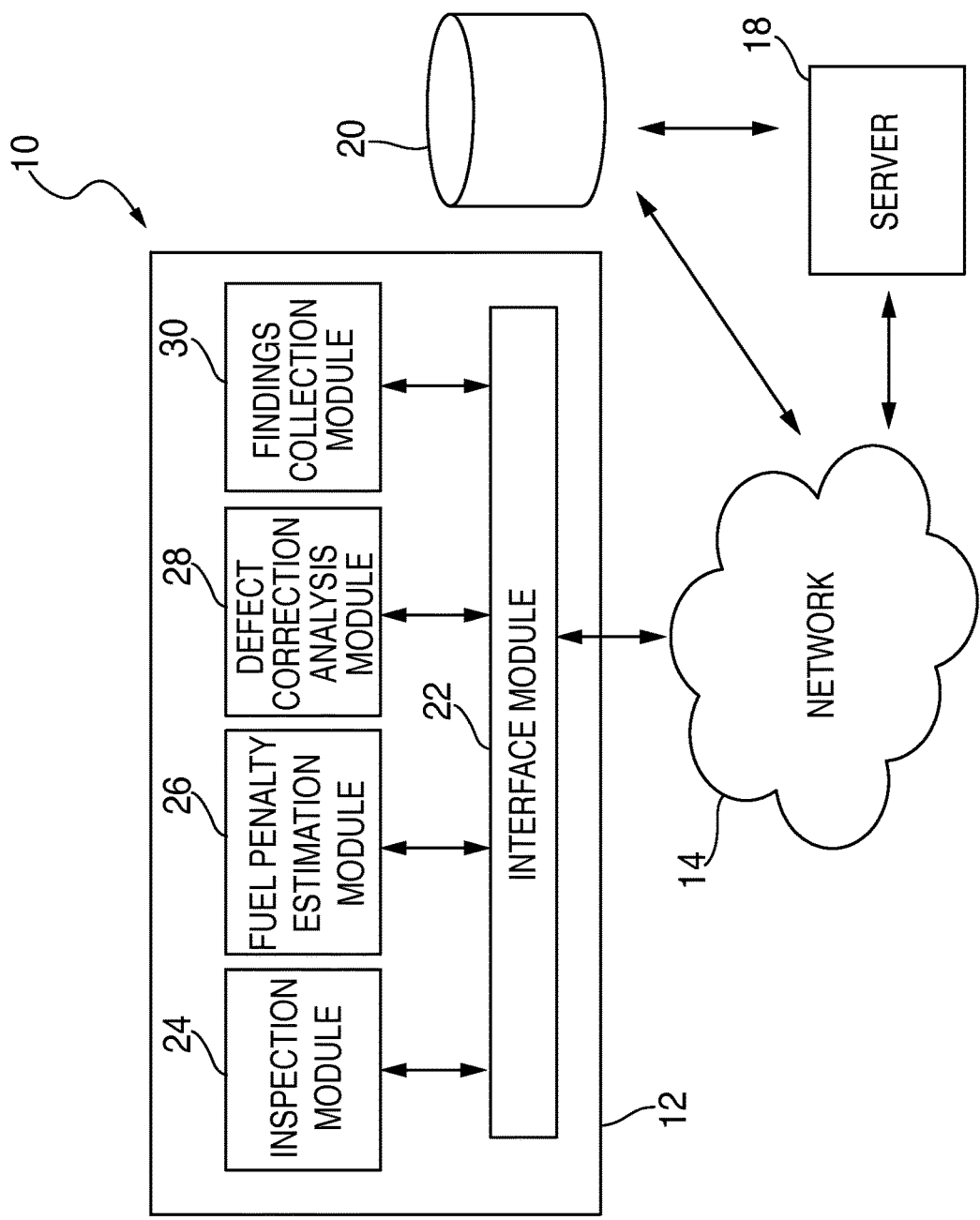
FIG. 1 illustrates an exemplary environment for the present aircraft aerodynamic audit system in accordance with an embodiment of the present disclosure.
Figure 2:
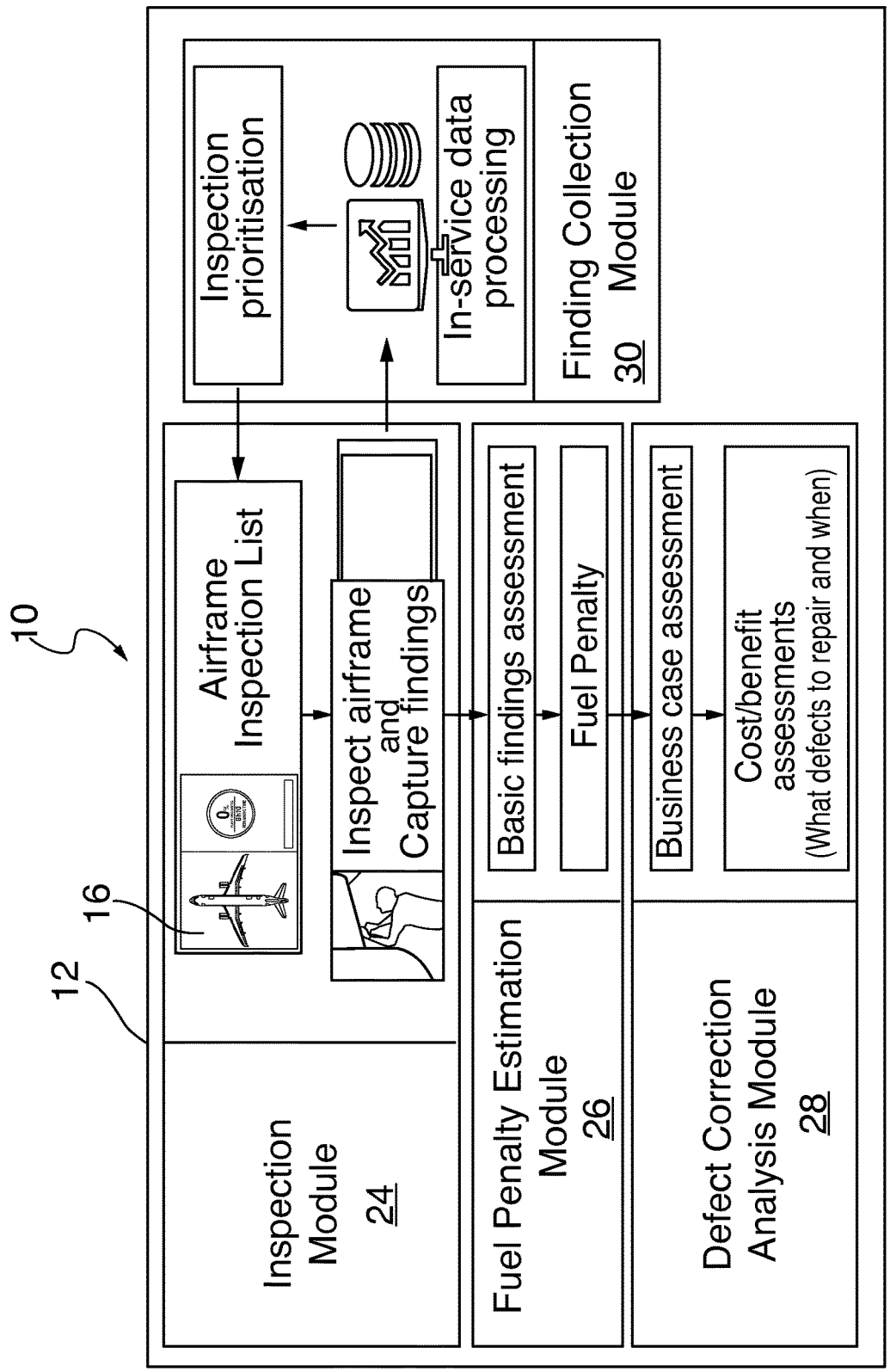
FIG. 2 is a functional block diagram of the present aircraft aerodynamic audit system of FIG. 1.

Referring now to FIGS. 1 and 2, an exemplary aircraft aerodynamic audit system for automatically performing a fuel penalty calculation based on detected aerodynamic defects of an aircraft is schematically illustrated and generally designated 10. The present aircraft aerodynamic audit system 10 can be installed in a portable computing device 12 or in a separate computing environment, such as a desktop computer, a laptop, a tablet computer, and the like.

It is contemplated that the present audit system 10 is programmed to perform tasks and control graphical illustration generated by the present system for different functional units via a network 14, such as a wireless or Wi-Fi network. As discussed above, the network 14 provides communication links between the maintenance entities for sharing data or information relating to the aerodynamic defects and the fuel penalty calculation.

The present system 10 enables an auditor, a maintenance operator, or other users to selectively review specific inspection areas of the aircraft using the computing device 12 having an interactive display device or screen 16 with an image representation capability. It is contemplated that the computing device 12 displays the inspection areas on the screen 16 for the auditor, and records or stores aerodynamic defects of the aircraft during inspection. As described in greater detail below, using the computing device 12, the auditor or other users can readily inspect the aircraft for finding and recording the aerodynamic defects, and calculate the fuel penalty related to each of the aerodynamic defects.

As an example only, the aerodynamic defects include, but are not limited to, aircraft surface rigging or misalignment, deteriorations, damages, protrusions, peeled-off paint, and the like. Synchronized data or information about the aerodynamic defects and the corresponding fuel penalties can also be stored or saved in a remote server 18 via the network 14 for subsequent retrieval by the auditor or other systems.

In a preferred embodiment, all relevant information is stored in a database 20, e.g., as a data storage device and/or a machine readable data storage medium carrying computer programs, for retrieval by the present system 10 and its children modules as desired. It is contemplated that one or more of the children modules can be installed in the portable computing device 12 or in the separate computing environment, such as the server 18 or other suitable computing systems to suit the application.

It is preferred that as one of the children modules, the present system 10 includes an interface module 22 for providing an interface between the computing device 12, the database 20, and the network 14. The interface module 22 controls the interface operation between, for example, the computing device 12, the network 14, and the server 18, and other related system devices, services, and applications. The other devices, services, and applications may include, but are not limited to, one or more software or hardware components, etc. For example, the database 20 is connected to the server 18 or the network 14 for sharing relevant data or information related to aircraft maintenance.

In a preferred embodiment, the present system 10 includes an inspection module 24 that receives a work definition for inspection or detection of the aircraft from an initiating institution, such as the airline management center or a maintenance, repair and overhaul (MRO) center. The inspection module 24 generates an inspection list having a predetermined inspection path or sequence including associated instructions for the aircraft, and displays the paths or sequences along with the associated instructions on the screen 16 of the computing device 12.

It is preferred that the predetermined inspection path is generated by the inspection module 24 based on a particular model of the aircraft. However, it is also contemplated that the inspection path is revised by the inspection module 24 based on a repair or maintenance history of the specific aircraft being inspected stored in the database 20. For example, when a repair or maintenance work has already been performed for the aircraft being audited, a replaced part or element of the aircraft does not need to be inspected immediately if the aircraft has not flown since the part was replaced or repaired. However, subsequent inspections may be performed as part of a regularly scheduled maintenance procedure.

In this case, the inspection module 24 modifies or adjusts the predetermined inspection path based on the repair or maintenance history of the aircraft to skip or omit inspection of the recently replaced part or element. As a result, the inspection path or sequence of the audited aircraft can be dynamically revised by the inspection module 24 as needed, thereby saving inspection time and reducing operating expenses.

Another important aspect of the inspection module 24 is that the inspection module accesses the database 20 of the aircraft manufacturer to check and reflect the latest updates made in the inspection path or sequence of the aircraft model. For example, when the aircraft manufacturer modifies the inspection path of the aircraft model, the inspection module 24 detects the modification and generates a new revised inspection path.

As another example, the inspection module 24 adjusts the inspection path based on statistical and historical information of a mechanical strength of the aircraft model's surface during a predetermined time period. Aircraft attributes, such as paint batches applied on the aircraft, parts used for the repair or maintenance, and experience feedback on a particular or similar aircraft models, are stored in the database 20 for statistical and historical comparisons. For example, the inspection module 24 may remove or add one or more steps in the inspection path based on the statistical and/or historical information as needed.

Following the displayed inspection paths, the auditor (or other users) inspects the aircraft and records the aerodynamic defects detected in or found on the aircraft. For example, the auditor follows the instructions displayed on the screen 16, and sequentially examines aircraft parts or elements shown in the inspection paths. When the auditor detects the aerodynamic defects, the auditor measures each defect and interactively enters the measurement into the present system 10 using the screen 16 as described below in paragraphs relating to FIGS. 8-15. It is preferred that a temporary database is provided in the computing device 12 to store the measurement until the synchronization occurs between the computing device and the server 18. As described in greater detail below, the measurement is uploaded to the database 20 for synchronization after completion of the inspection.

For example, during the synchronization, the measurements taken during the inspections are uploaded from the temporary database of the computing device 12 to the database 20 of the server 18. Conversely, updated versions of software, work definitions, or audit reports are downloaded from the database 20 of the server 18 to the temporary database of the computing device 12. Other suitable, relevant data or information is synchronized depending on the application.

Exemplary aerodynamic defects include door and flight control surface riggings or misalignments having steps, leaks, or gaps. Also, the gaps and leaks from fixed or moving surface seals are examined for aerodynamic anomalies. Further, dents, scratches, repair patches and paint or skin joint defects are inspected for surface damage and deterioration around the aircraft.

Also included in the present system 10 is a fuel penalty estimation module 26 that calculates an estimated fuel penalty caused by the corresponding aerodynamic defect. An assessment of each defect is performed by the fuel penalty estimation module 26 by associating a value of the fuel penalty to a value of the measurement, both of which are stored in the database 20. Although the database 20 is shown separately from the server 18, the database can be included in the server or other systems depending on different applications.

In one embodiment, the fuel penalty estimation module 26 is hosted in the computing device 12 as a standalone software or hardware component, such that the inspection results are immediately available to the user after completion of the inspection. In another embodiment, the fuel penalty estimation module 26 is hosted in the server 18, so that a third party, such as an aircraft manufacturer, can receive and view the inspection results to adjust the aircraft models and prioritize the inspection procedures. Similarly, other children modules can be installed in the portable computing device 12 or in the separate computing environment, such as the server 18 or other suitable computing systems to suit the application.

It is preferred that the fuel penalty value is determined based on at least one of experimental data, actual data, and simulation data associated with the detected defects. For example, the experimental data are collected by testing a left or port wing having the aerodynamic defect at a wind tunnel test facility. Also, the actual data are collected during each flight regardless of the presence of the aerodynamic defects. Regarding the fuel penalty value, a first set of actual data with the aerodynamic defect is collected, and a second set of actual data without the aerodynamic defect is collected. These two sets are compared to refine or adjust the fuel penalty value associated with the particular defect. The simulation data are collected using a flight simulator.

Further, other actual, modeled, or computer-assisted data can be collected and saved in the database 20 during actual flight operation. It is also contemplated that other third party institutions, such as a manufacturer of the aircraft or other airline companies, store these types of actual or simulated data in the database 20, such that inspection results or tests in flight fuel consumption reports or findings are considered and synchronized in relation to the specific aerodynamic defects.

For example, the fuel penalty estimation module 26 accesses the database 20 of the aircraft manufacturer via the network 14, and associates the fuel penalty value with the measurement of the specific aerodynamic defect found on the aircraft. The fuel penalty estimation module 26 adjusts the fuel penalty value based on the synchronized experimental, actual or simulated data received from the aircraft manufacturer.

It is contemplated that the database 20 of the aircraft manufacturer has statistical and/or historical information about the aerodynamic defects and corresponding fuel penalty values based on a model of the aircraft. For example, the historical information may include initial inspection results after the audit of the aircraft, and the repair results after the correction of the aerodynamic defects.

A defect correction analysis module 28 is also included in the present system 10 for analyzing the detected aerodynamic defects based on a cost and benefit assessment. In other words, the defect correction analysis module 28 generates a repair order of the detected aerodynamic defects, i.e., which defects are to be corrected or repaired before other defects, and when the correction or repair should occur. Specifically, the defect correction analysis module 28 performs a business case assessment on each detected aerodynamic defect, and determines a priority using the cost and benefit assessment based on the adjusted corresponding fuel penalty value.

A findings collection module 30 generates an audit report (FIG. 3) based on the inspection and analysis of the defects. Additional data processing steps are optionally performed by the findings collection module 30 to provide graphical presentation of the audit report (e.g., a pie or bar graph showing a fuel consumption trend per each defect). A detailed description of the audit report is provided below in paragraphs relating to FIG. 3.

Based on the audit report, the findings collection module 30 can propose or suggest a repair path or sequence to correct the defects in a predetermined order based on the priority. As such, the defects having the highest ratio of benefit to cost are proposed or suggested to be repaired before defects having a lower ratio of benefit to cost.

All fuel consumption data relating to the previous and repaired defects are stored in the database 20 via the network 14 for subsequent inspection operations by the present system 10. As with the children modules 22-30, the database 20 can be installed in the portable computing device 12 or in the separate computing environment, such as the server 18 or other suitable computing systems to suit the application.

Figure 3:
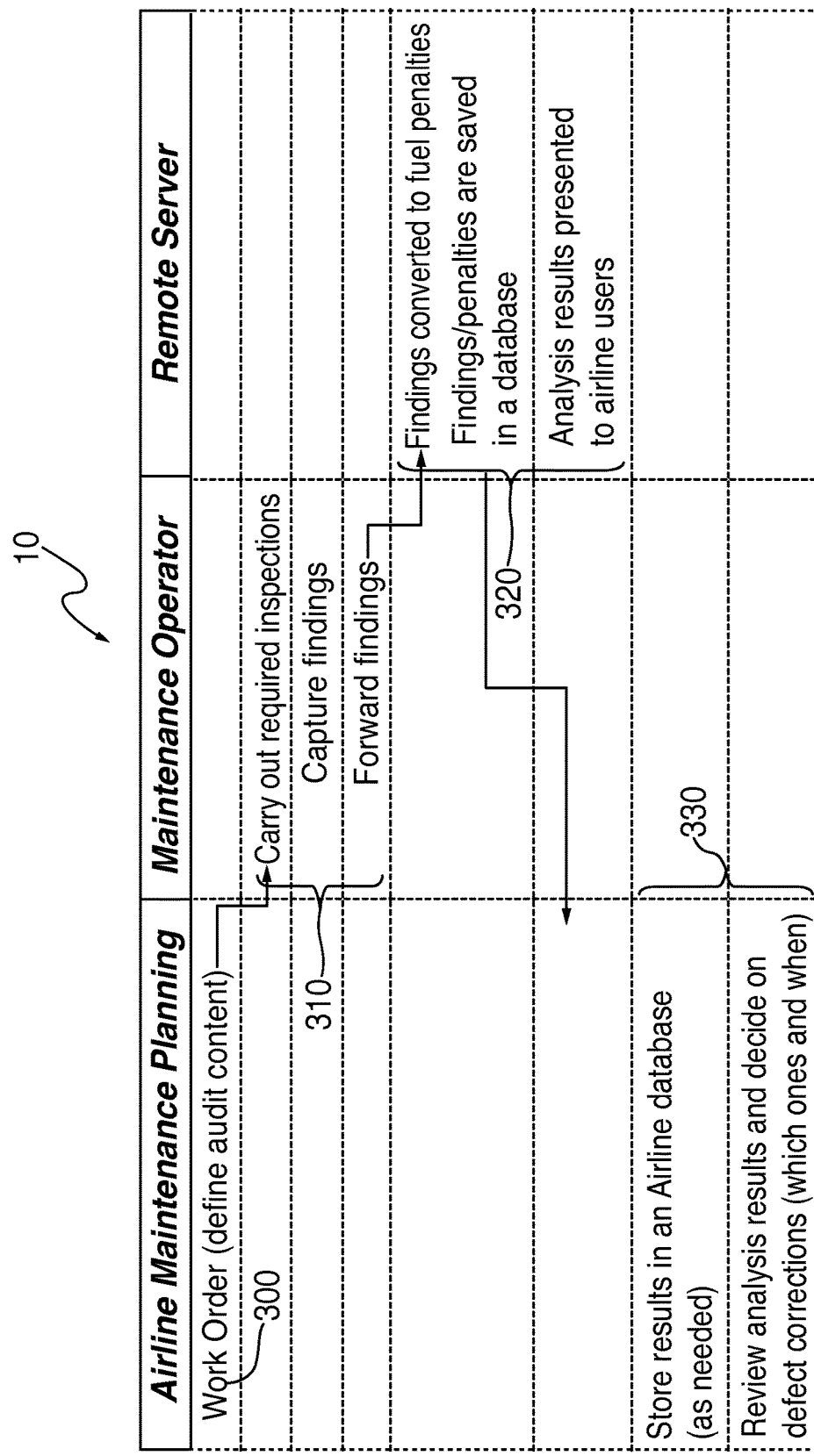
FIG. 3 illustrates an exemplary flowchart of the present aircraft aerodynamic audit system of FIG. 1.

Referring now to FIGS. 1 and 3, an exemplary flowchart of the present aircraft aerodynamic audit system 10 is illustrated. In step 300, the inspection module 24 receives the work definition requesting the inspection of the aircraft for the aerodynamic defects. In step 310, the auditor or maintenance operator performs the requested inspection, and captures or saves the defect findings in the computing device 12 using the interactive screen 16. Subsequently, the inspection module 24 forwards the defect findings to the fuel penalty estimation module 26 for converting the defect findings to the fuel penalty values.

In step 320, the fuel penalty estimation module 26 receives the forwarded defect findings, and converts the findings into the fuel penalty values based on the synchronized data in the database 20. As discussed above, the database 20 may be a subsystem of the server 18, and the defect findings and the fuel penalty values are stored in the database. When the defect correction analysis is completed by the defect correction analysis module 28, the audit report having analysis results is graphically presented to the auditor using the screen 16.

In step 330, the findings collection module 30 stores the analysis results in the database 20, and the auditor can review the audit report and decide which defects are corrected in a certain order. Alternatively, the findings collection module 30 can propose or suggest a repair path or sequence to the auditor for correcting the defects in a predetermined order based on the priority of each defect. It is also contemplated that the findings collection module 30 transmits information about the defects and repair results to the aircraft manufacturer to provide the data relating to a specific aircraft model.

Referring now to FIG. 4, an exemplary audit report may include various information columns, such as an inspection zone 32, an inspection description 34, a defect finding 36, a fuel penalty value 38, and a correction task 40. Other attributes related to the defects and fuel penalty values are contemplated to suit different applications.

More specifically, the inspection zone 32 includes information about a specific inspection area of the aircraft, such as a left or port wing, a right or starboard wing, a forward fuselage, an aft fuselage, and the like. The inspection description 34 includes information about each detected aerodynamic defect.

Measurements of the detected defects in either a metric or imperial system are included in the defect finding 36, and optionally, additional information indicators about the defect, e.g. "T" for text attachments, "P" for photos, or "NONE" for no texts or photos. Also included in the audit report are the fuel penalty value associated with each defect, shown in the fuel penalty value 38, e.g., 5 kilograms (KG) per flight hour (FH), and a corresponding corrective task defined in an Aircraft Maintenance Manual (AMM), shown in the correction task 40.

Referring now to FIGS. 1 and 5-19, an exemplary computing device 12 having the interactive display or screen 16 is shown. Initially, on a welcome page, the auditor enters an identification number of the aircraft in an input box 42 (FIG. 5) on the screen 16. It is also contemplated that the input box 42 receives a task card number or work definition (e.g., TC1234) and a name or identifier of the auditor. It is preferred that an aircraft registration is the only mandatory field during signing-in.

Figure 5:
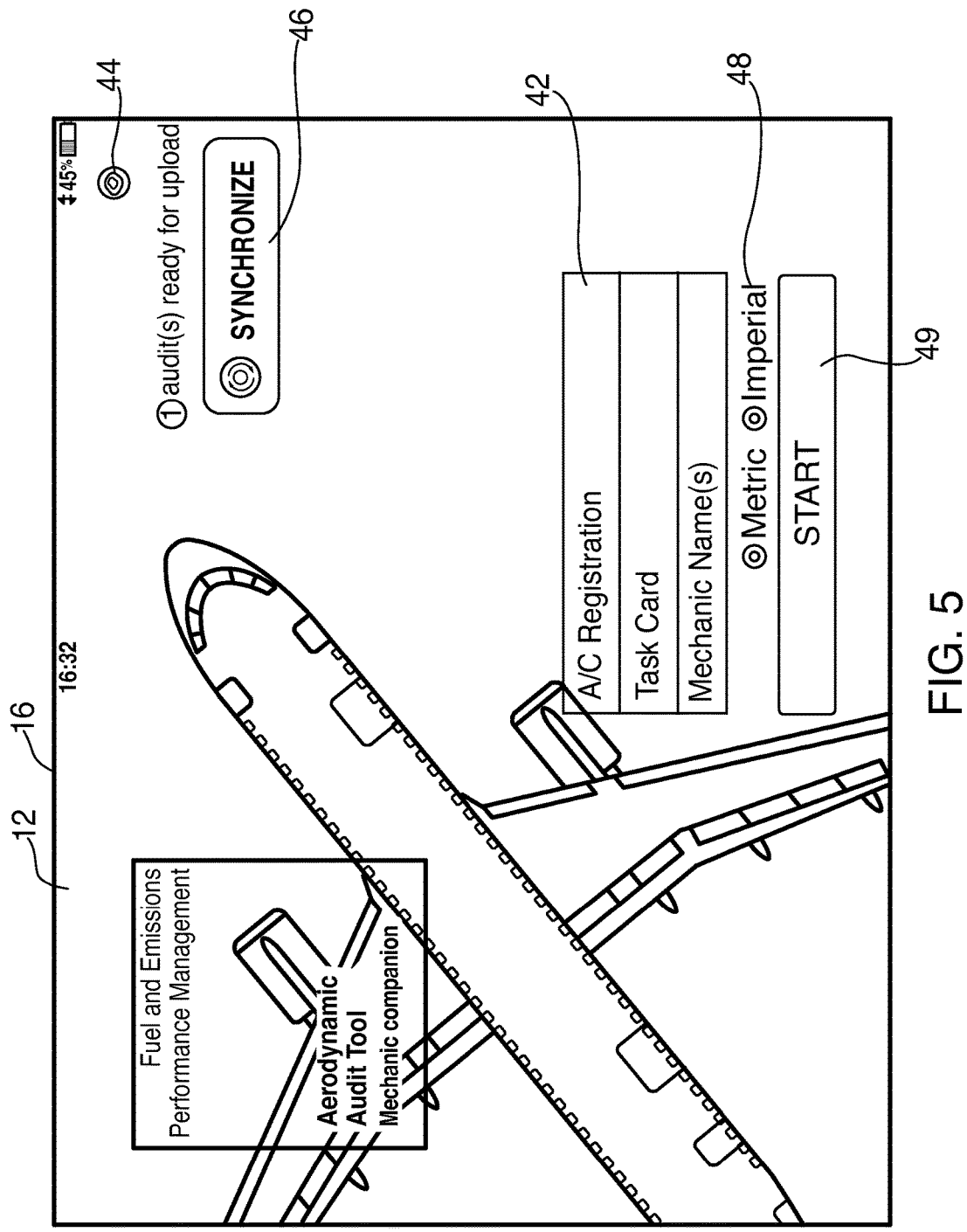

As shown in FIG. 5, a user documentation button 44 is disposed on an upper right corner of the screen 16 for providing an overview information about the inspection task card. Also, a synchronization button 46 is provided below the user documentation button 44 for uploading or forwarding the defect findings stored in the temporary database to the server 18 via the network 14. Locations of the input box 42, and the buttons 44, 46 on the screen 16 are variable to suit the application. A unit of measure can be determined by selecting one of metric or imperial buttons 48. The auditor starts the inspection process by clicking on a start button 49.

Figure 6:
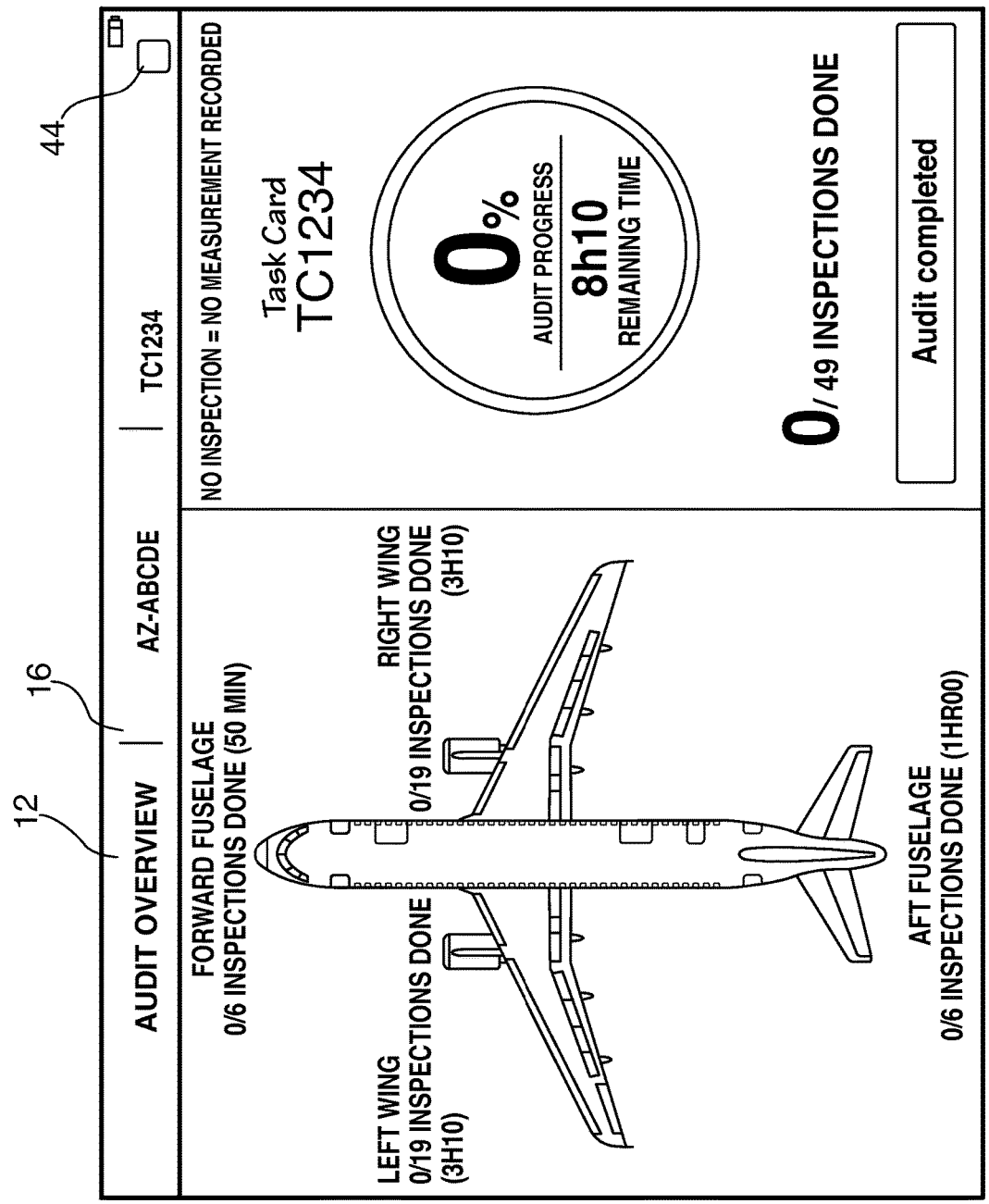

In FIG. 6, an exemplary overview screen displaying information about the inspection task card (e.g., TC1234). For example, the inspection can be divided by four aircraft zones, such as a forward fuselage, an aft fuselage, a left or port wing, and a right or starboard wing. Other suitable divisions are also contemplated depending on different applications. The overview screen may provide an audit progress in terms of a numerical percentage and a remaining time period, but other suitable methods, such as a progress bar or indicator, are contemplated. Then, the auditor can interactively touch a specific region of the aircraft displayed on the screen 16 to transition to an inspection screen (FIG. 8).

Figure 7:
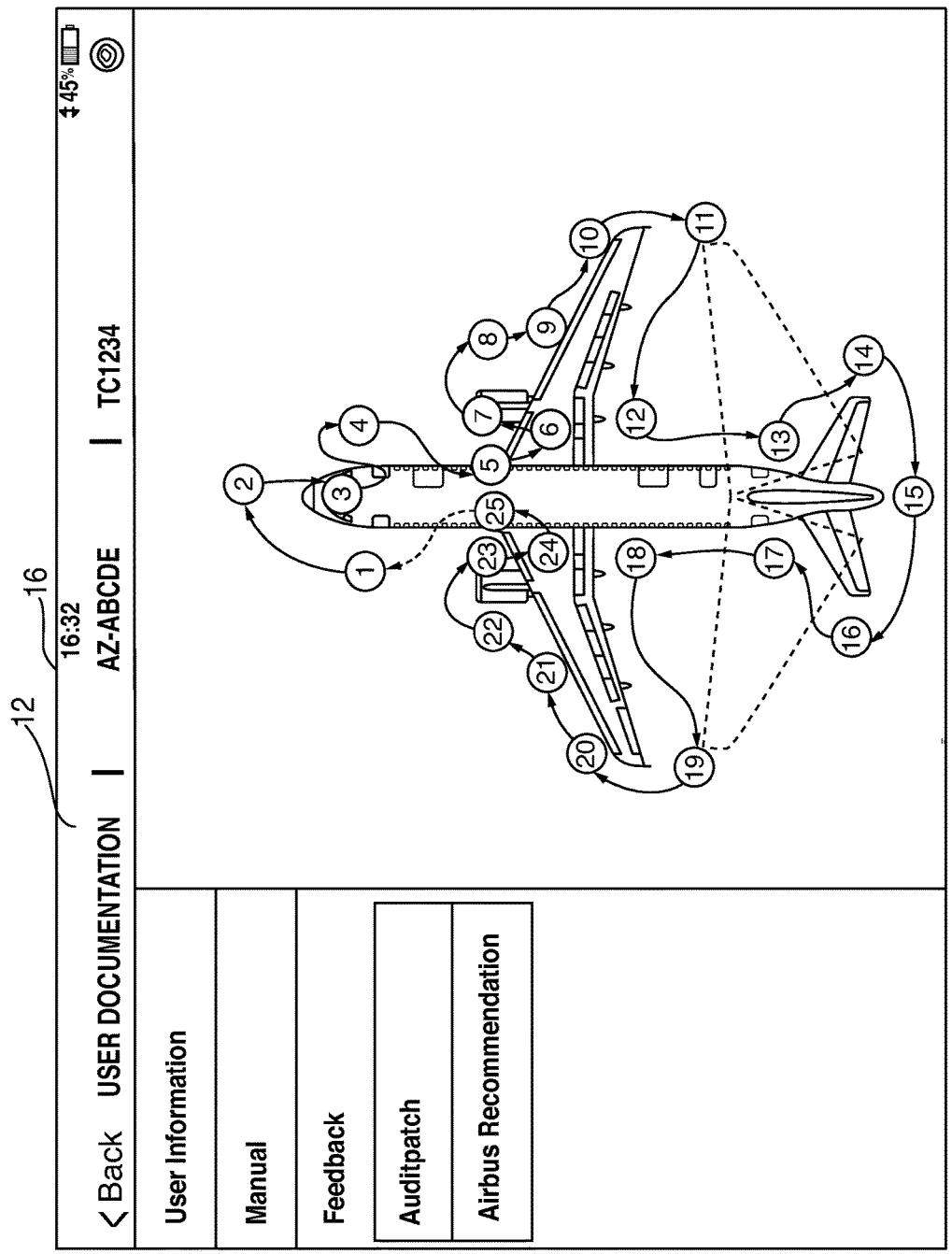

In FIG. 7, an exemplary user documentation screen displaying information about the audit path or sequence is shown. For example, this audit path is recommended or suggested by the present system 10 and is graphically illustrated for an easy overview of the audit path for the auditor. Each audit step is numerically designated to show the sequence of inspection steps.

Figure 8:
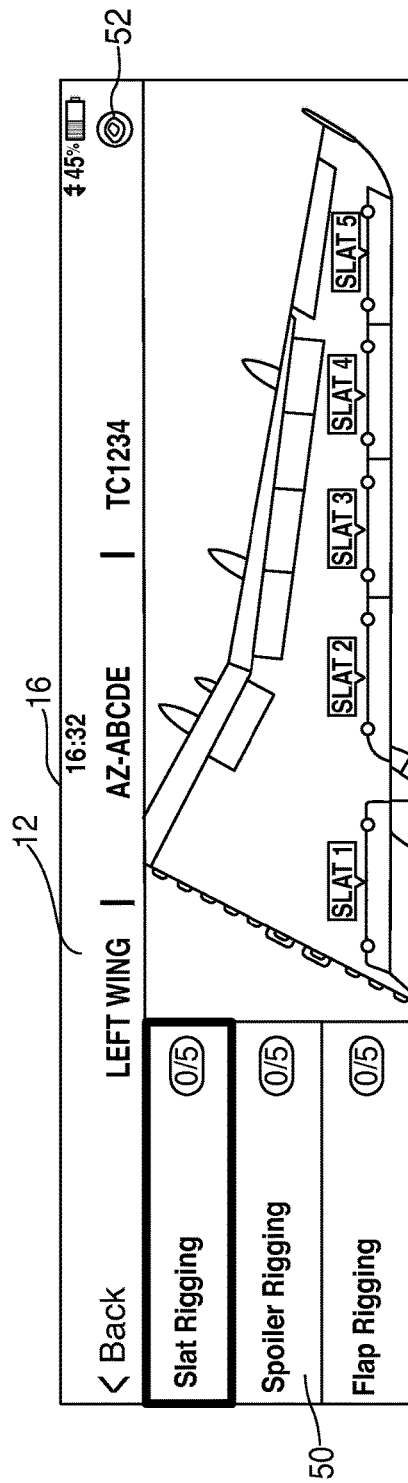

In FIG. 8, an exemplary inspection screen for the left wing is shown. An inspection list panel or pane 50 including various inspection areas is disposed on a left side of the screen 16. In this example, slats of the left wing are inspected by the auditor for any aerodynamic defects. A graphical presentation of the left wing is shown on a right top corner of the screen 16, for illustrating inspection locations or areas of measurement points. Slats 1 to 5 are graphically presented for ease of reference.

Figure 9:
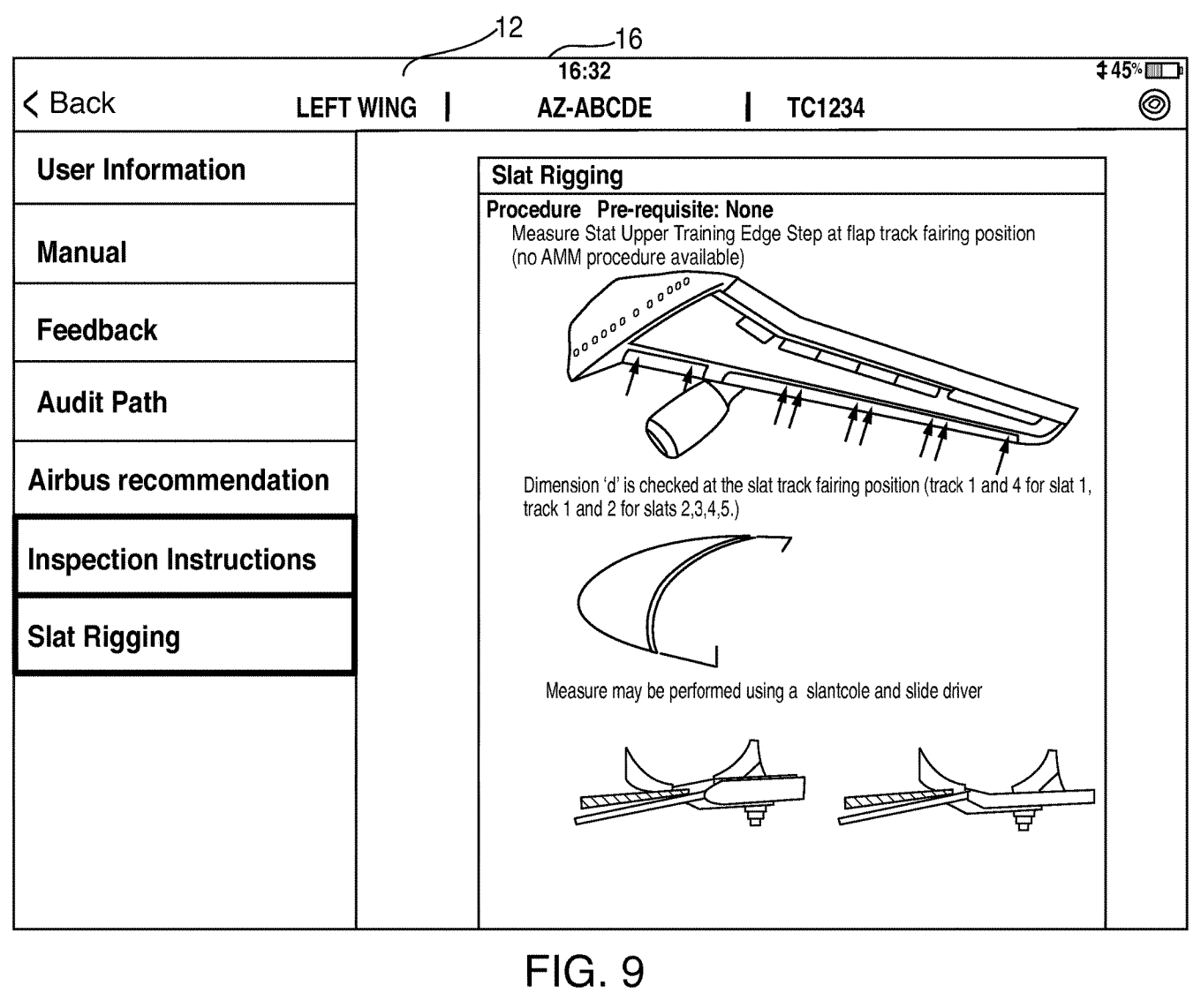

An inspection procedure button 52 is provided on an upper right corner of the screen 16 for illustrating a detailed inspection procedure related to the left wing (FIG. 9). A defect finding capture panel 54 is provided on the screen 16 for recording the defect measurements of the slats. In this example, there are five slats, SLAT 1-5, on the left wing, and each slat is subdivided into two sections, namely an inboard region and an outboard region. Each subsection of the slat is separately inspected and measured for an aerodynamic defect. When a measurement button 56 in the defect finding capture panel 54 is selected or clicked by the auditor, a finding input screen (FIG. 10) is displayed on the screen 16.

In FIG. 9, an exemplary inspection procedure screen is shown that is directed to defect measurement techniques and methods for the left wing. For example, the inspection procedure screen displays detailed explanation of where and how to take the defect measurements using textual and graphical representation.

Figure 10:
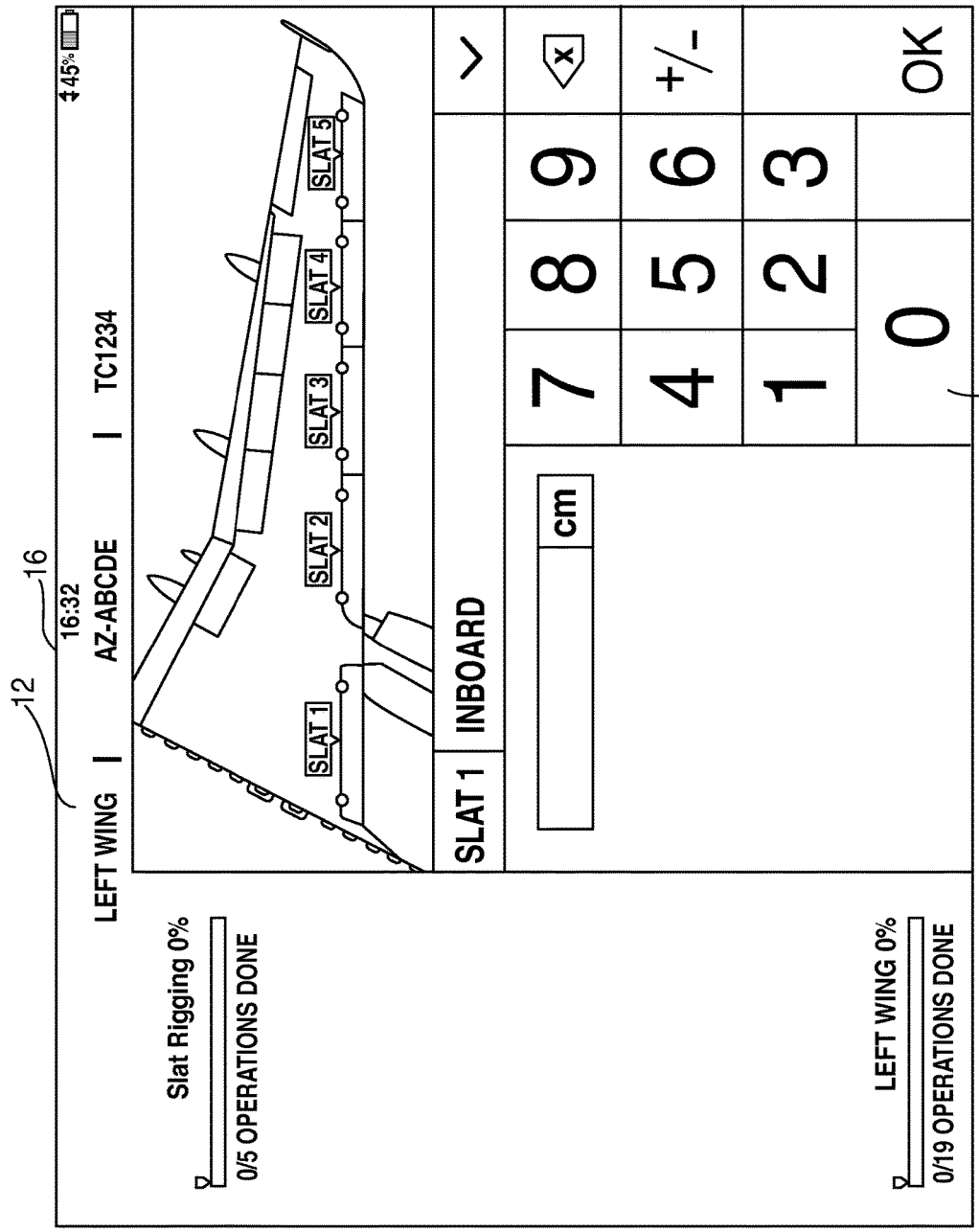

In FIG. 10, an exemplary finding input screen is shown. It is contemplated that the defect findings are recorded or inputted either in the metric or imperial system, as selected via the welcome screen (FIG. 5). A measurement value can be manually obtained with a scale or ruler, or other measuring tools, and entered manually by using a number pad 58.

In another embodiment, an image-capturing device, such as a built-in camera, can be integrated with or incorporated in the computing device 12. It is contemplated that the image-capturing device is designed for electrically measuring the defect and automatically calculating the corresponding measurement value, for example, by using an optical distance measuring device coupled to the computing device 12 using an optical beam. Other suitable measuring devices are contemplated as known in the art.

Figure 11:
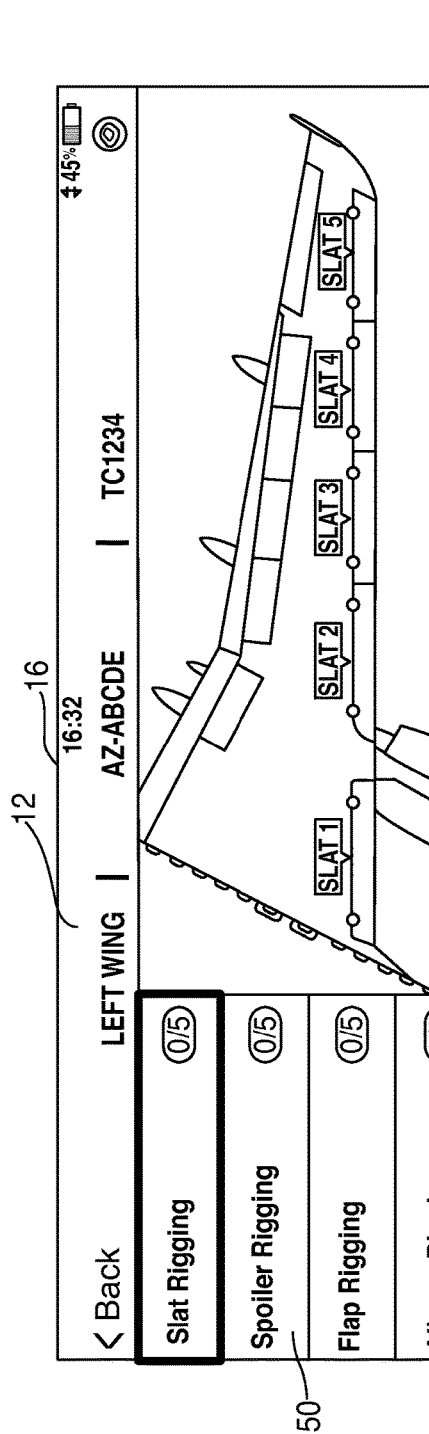

In FIG. 11, when a measurement input process is completed using the finding input screen (FIG. 10), the inspection screen (FIG. 8) is updated with the measurement value, e.g., 2.5 centimeters. However, the measurement value can be revised or adjusted manually at any time before final validation by the auditor. An additional information button 60 is provided for each slat to record auxiliary information, such as textual descriptions (FIG. 12) and photographic images (FIG. 13).

Figure 12:
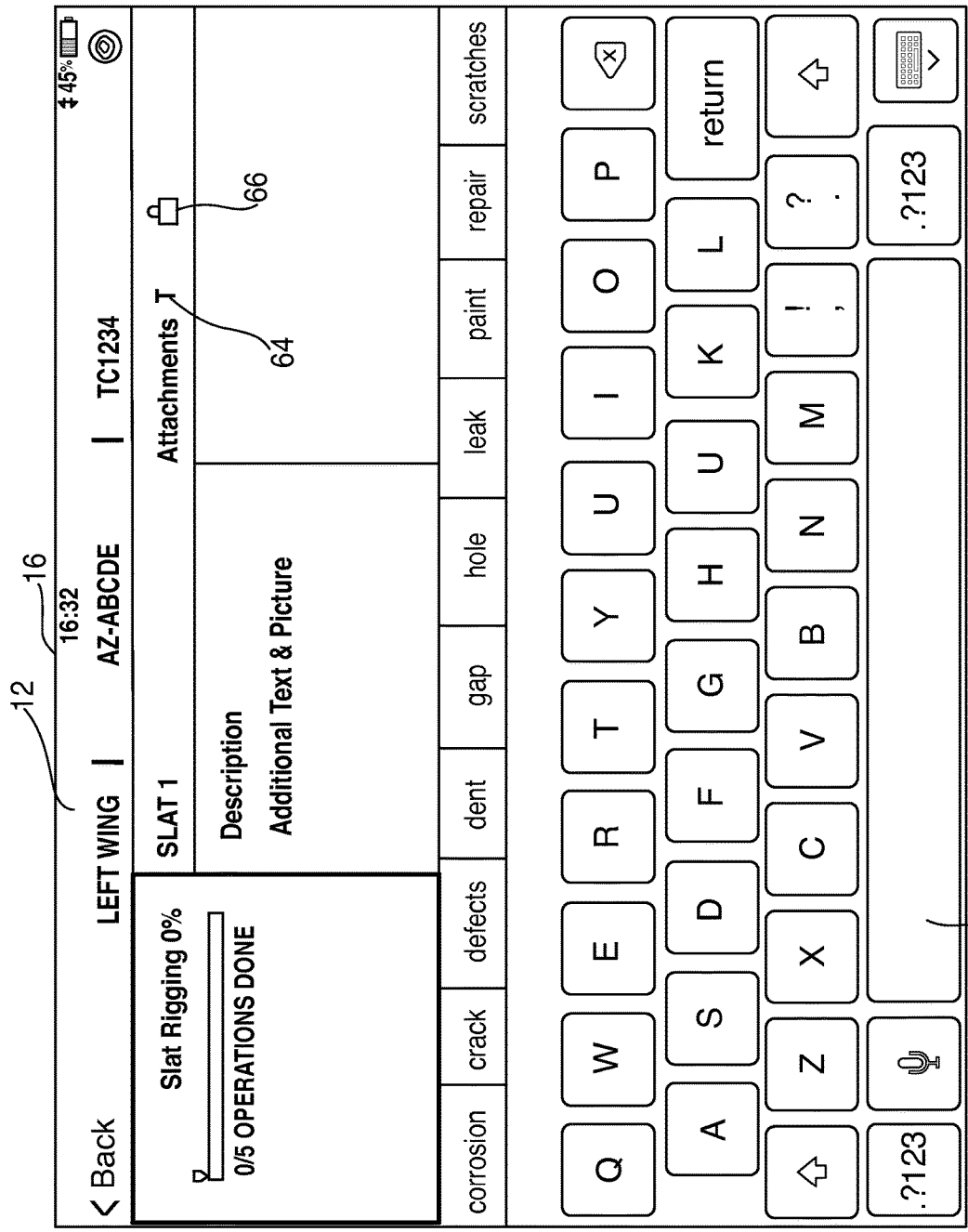

In FIG. 12, an exemplary text entry screen is shown. A virtual or actual keyboard 62 is provided on the screen 16 for entering the auxiliary information about the detected slat rigging. Other attachments can be linked or associated with the auxiliary information by using a text attachment button ("T") 64, or a photo attachment button ("P" or camera icon) 66.

Figure 13:
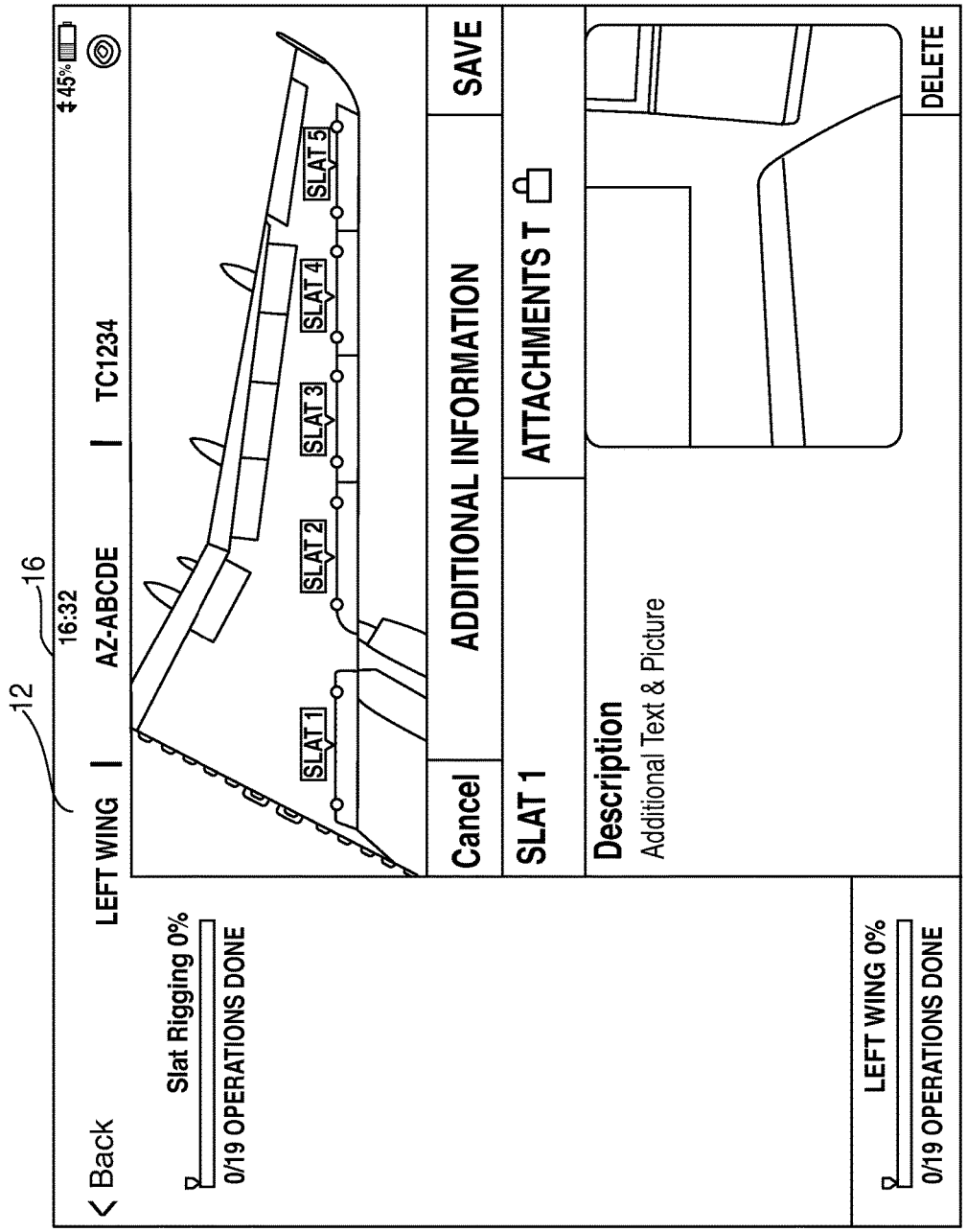

In FIG. 13, an exemplary image entry screen is shown. For example, using an image-capturing device of the computing device 12, such as a photographic camera, the auditor can capture an image of the detected aerodynamic defect for additional information, and upload the image to the temporary database of the computing device 12. Supplementary annotations can also be added to the uploaded image by the auditor as desired. As discussed above, the uploaded information in the temporary database can be forwarded to and synchronized with the data stored in the database 20 after the validation.

Figure 14:
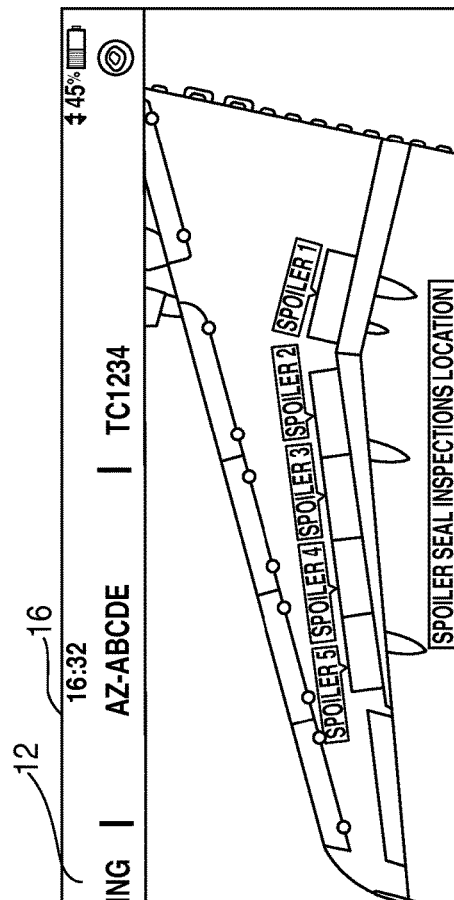

In FIG. 14, another example of the inspection screen (FIG. 8) is shown having two defect measurements recorded or inputted by the auditor. In this example, a first spoiler seal SPOILER 1 has a 5 centimeter gap in the inboard region of the left wing, and a 1 centimeter gap in the outboard region of the left wing. An inspection status pane 68 is provided on the lower left corner of the screen 16 for informing the auditor of a progress of the inspection. In this example, one out of 15 inspection sequences is completed, which denotes 5 percent completion of the inspection for the left wing.

Figure 15:

In FIG. 15, yet another example of the inspection screen (FIG. 8) is shown having four defect measurements recorded or inputted by the auditor. In this example, four defects are detected on an upper high sensitivity surface of the left wing, and thus four defect measurements are entered in a measurement input pane 70 of the defect finding capture panel 54. Two measurements are entered in a paint column, one measurement is entered in a patch column, and one measurement is entered in a scratch/dent column. Each row of the measurement input pane 70 represents a specific inspection area of the upper surface of the left wing. It is also contemplated that a return or back button 72 is provided on an upper left corner of the screen 16 for redirecting to the overview screen (FIG. 6) as desired.

Figure 16:
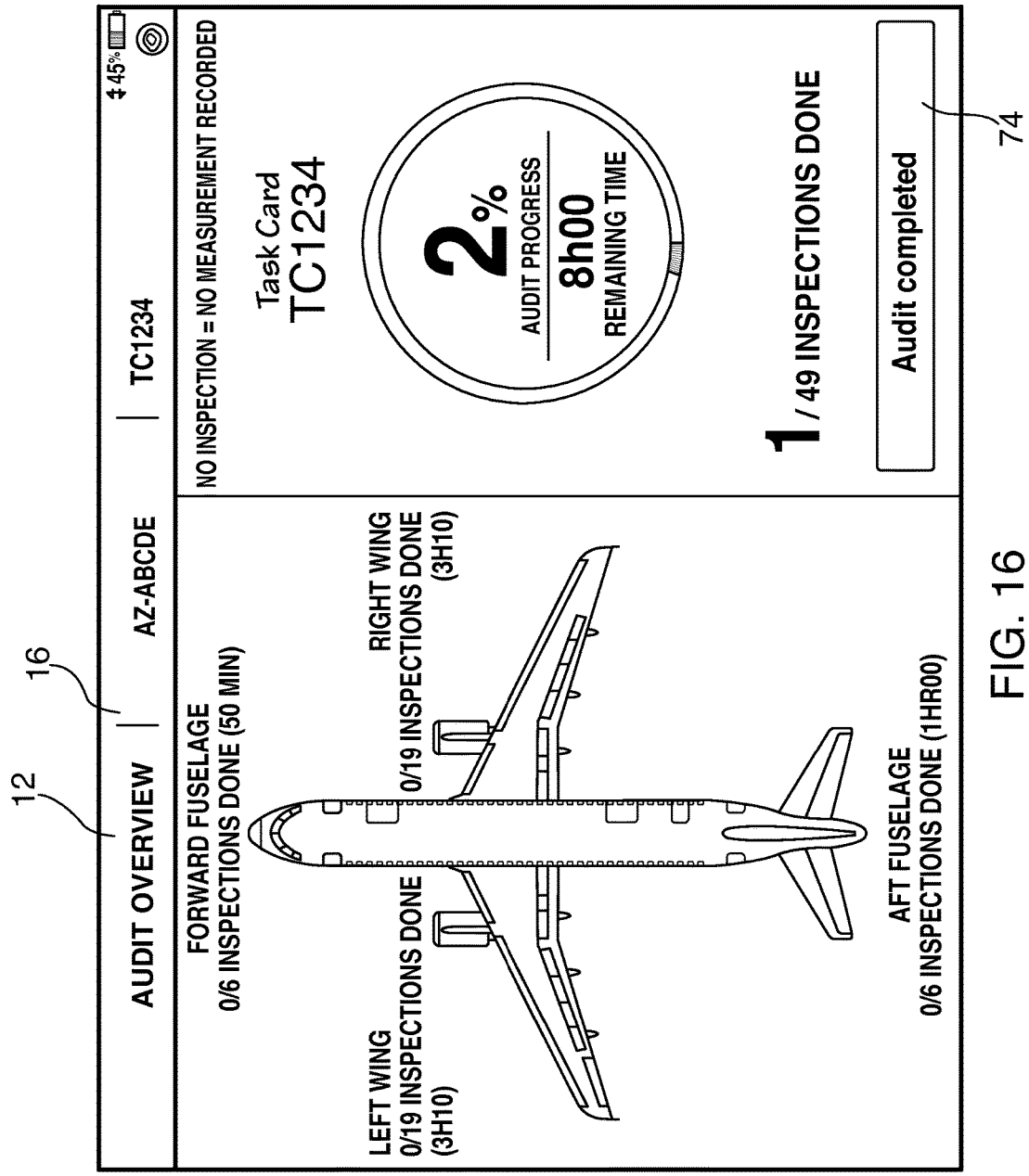

In FIG. 16, when the return button 72 is pressed or clicked by the auditor, the overview screen (FIG. 6) displays an updated overview information of the inspection progress. In this example, for the task card TC1234, a left window or pane indicates that one out of 19 inspections are completed for the left wing, and a right window or pane indicates that 2 percent of the audit process is completed with 8 hours remaining for the rest of inspection.

Five inspections are yet to be performed for the forward fuselage, and similarly, 19 inspections left for the right wing, and 6 inspections left for the aft fuselage. Thus, one out of 49 inspections is completed. It is preferred that when the entire inspection or audit process is completed, an "Audit Completed" button 74 is displayed on the screen 16.

Figure 17:
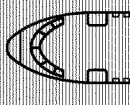

In FIG. 17, when the "Audit Completed" button 74 is clicked by the auditor, a warning pop-up window 76 having a cancel button 78 and a validate button 80 is displayed on the screen 16. If the cancel button 78 is selected, the auditor can modify or review the defect findings or measurements, but if the validate button 80 is selected, the present system 10 locks the defect findings and measurements, and prevent them from being modified or changed.

Figure 18:
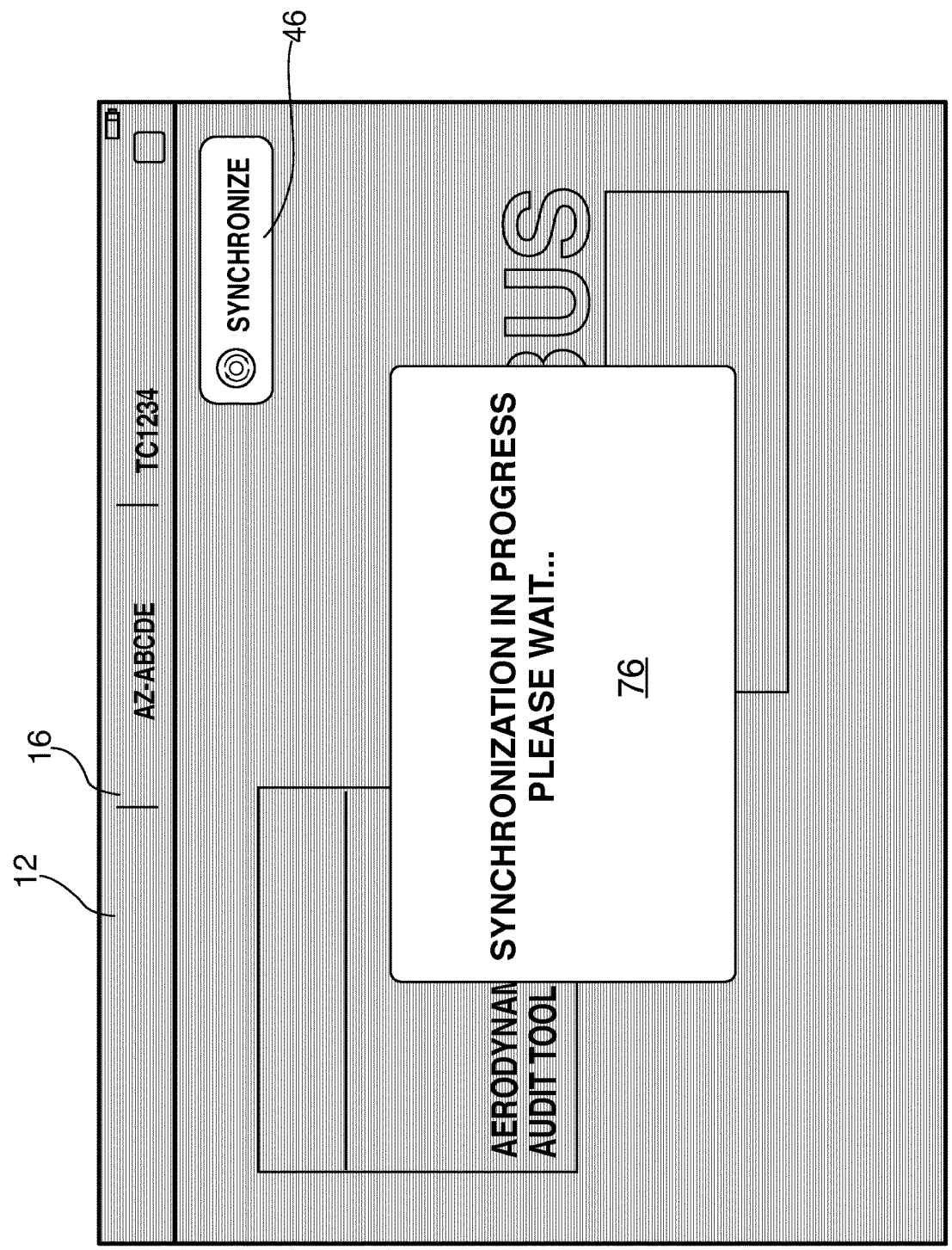

In FIG. 18, when the synchronization button 46 is activated after the validation, the present system 10 automatically uploads the defect findings and measurements to the server 18, and synchronizes with the synchronized data stored in the database 20. For example, the audit data are transmitted to the server 18, and stored in the database 20 for subsequent retrieval by the present system 10 or other related systems, such as the aircraft manufacturer systems.

It is contemplated that the synchronization button 46 can be activated when the validate button 80 is clicked, and also, the upload and synchronization process begins automatically when a connection to the database 20 or the server 18 is established via the network 14. For example, when the Wi-Fi connection is established between the computing device 12 and the server 18, the upload and synchronization process commences automatically without activating the synchronization button 46.

Figure 19:
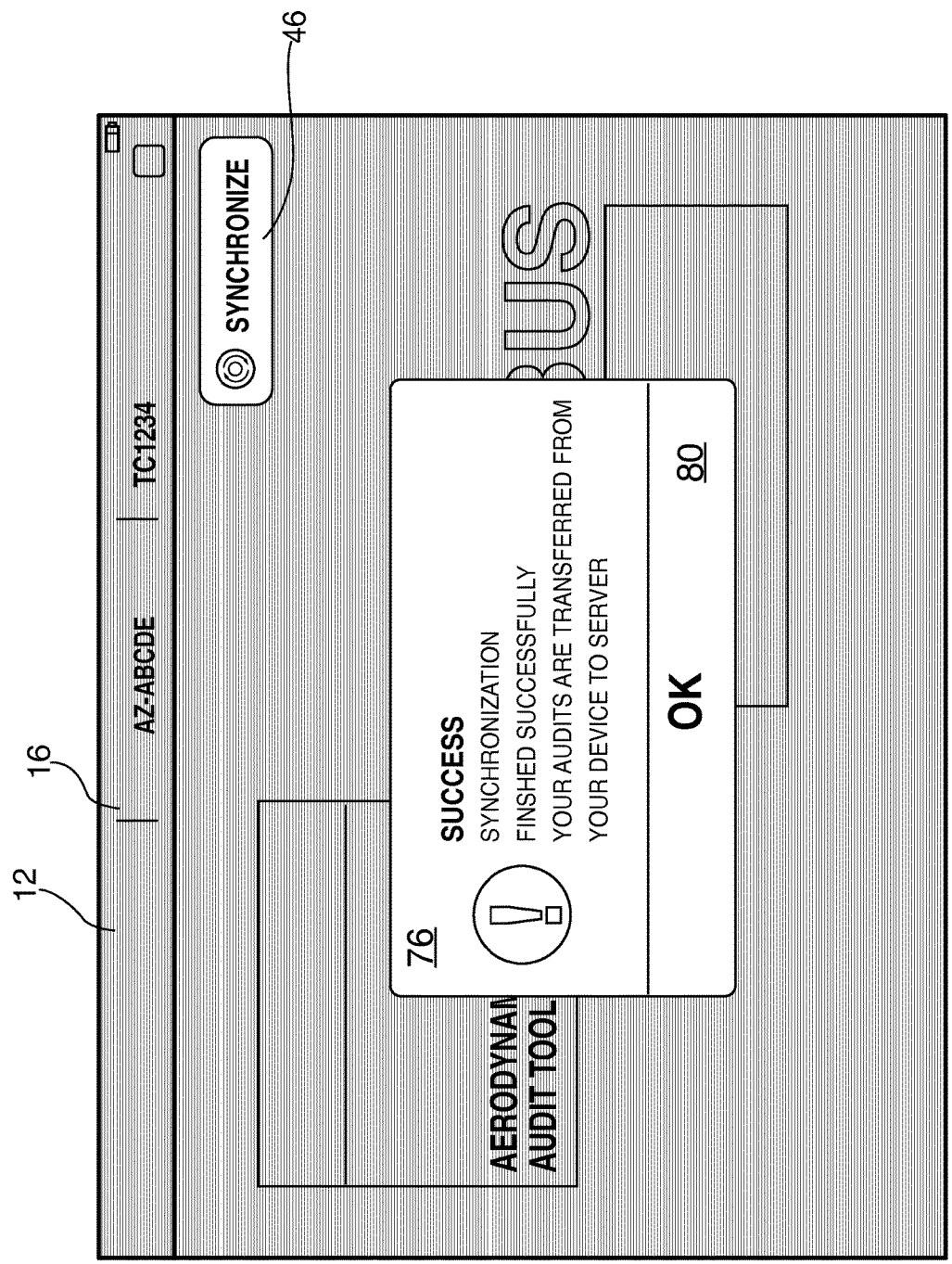

In FIG. 19, when the automatic upload and synchronization are completed, a success pop-up screen is displayed on the screen 16. It is contemplated that an "OK" button 82 is provided on the success pop-up screen for the auditor to end the inspection process.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

What is claimed is:

1. An aerodynamic audit system for performing an audit process of an aircraft using a computing device via a network, comprising:
   an inspection module for inspecting at least a portion of the aircraft for locating and measuring any aerodynamic defects present by generating an inspection list having a predetermined inspection path;

a display device that displays the inspection path and accepts a measurement of any located aerodynamic defect;

a fuel penalty estimation module that calculates an estimated fuel penalty of the aerodynamic defect based on the measurement of the corresponding aerodynamic defect;

a defect correction analysis module that analyzes the aerodynamic defect based on a cost and benefit assessment;

a findings collection module that generates an audit report based on the inspection and analysis of the aerodynamic defect; and a database that stores data associated with the aerodynamic defect and the corresponding fuel penalty based on the cost and benefit assessment.

2. The aerodynamic audit system of claim 1, further comprising an interface module for providing an interface between the computing device, the database, and the network.

3. The aerodynamic audit system of claim 1, wherein the inspection path is generated by the inspection module based on a model of the aircraft.

4. The aerodynamic audit system of claim 1, wherein the inspection path is revised by the inspection module based on an aerodynamic defect located or maintenance history of the aircraft.

5. The aerodynamic audit system of claim 1, wherein the inspection module detects a modification in the inspection path made by an aircraft manufacturer, and generates a new inspection path for the aircraft based on the detected modification.

6. The aerodynamic audit system of claim 1, wherein the inspection module adjusts the inspection path and the inspection list based on at least one of statistical and historical information of the aircraft during a predetermined time period.

7. The aerodynamic audit system of claim 1, wherein the fuel penalty estimation module performs an assessment of each aerodynamic defect located by associating a value of the fuel penalty to a value of the measurement of the corresponding aerodynamic defect.

8. The aerodynamic audit system of claim 7, wherein the value of the fuel penalty is determined based on at least one of: experimental data, actual data, and simulation data associated with the corresponding defect.

9. The aerodynamic audit system of claim 1, wherein the database stores the data associated with the aerodynamic defect and the corresponding fuel penalty obtained from a third party institution.

10. The aerodynamic audit system of claim 9, wherein the fuel penalty estimation module synchronizes the data in the database with the third party institution in relation to the aerodynamic defect.

11. The aerodynamic audit system of claim 10, wherein the fuel penalty estimation module adjusts the fuel penalty based on the synchronized data received from the third party institution.

12. The aerodynamic audit system of claim 1, wherein the database includes at least one of statistical and historical information about the aerodynamic defect and corresponding fuel penalty based on a model of the aircraft.

13. The aerodynamic audit system of claim 1, wherein the defect correction analysis module generates a repair order of the aerodynamic defect based on a priority determined by the cost and benefit assessment.

14. The aerodynamic audit system of claim 1, wherein the findings collection module provides graphical presentation of the audit report.

15. The aerodynamic audit system of claim 1, wherein the findings collection module suggests a repair path to correct the located aerodynamic defects in a predetermined order based on a priority determined by the cost and benefit assessment.

16. The aerodynamic audit system of claim 1, wherein the display device displays a synchronization button for uploading located aerodynamic defects and associated measurements to a remote server via the network.

17. The aerodynamic audit system of claim 16, wherein when the synchronization button is activated, the located aerodynamic defects and associated measurements are synchronized with the data stored in the database for subsequent retrieval.

18. An aerodynamic audit method for performing an audit process of an aircraft using a computing device via a network, comprising:

inspecting at least a portion of the aircraft, using the computing device, to locate and measure any aerodynamic defects present by generating an inspection list having a predetermined inspection path;

displaying the inspection path and accepting a measurement of any located aerodynamic defect;

calculating an estimated fuel penalty, using the computing device, of the aerodynamic defect based on the measurement of the corresponding aerodynamic defect;

analyzing the aerodynamic defect, using the computing device, based on a cost and benefit assessment;

generating an audit report, using the computing device, based on the inspection and analysis of the aerodynamic defect; and storing data associated with the aerodynamic defect and the corresponding fuel penalty based on the cost and benefit assessment in a database.

* * * * *